(12) United States Patent
Zaslavsky et al.

(10) Patent No.: US 11,222,101 B1
(45) Date of Patent: Jan. 11, 2022

(54) USER BEHAVIOR ANALYTICS USING KEYSTROKE ANALYSIS OF PSEUDO-RANDOM CHARACTER STRINGS

(71) Applicant: RSA Security LLC, Bedford, MA (US)

(72) Inventors: Alex Zaslavsky, Chestnut Hill, MA (US); Salah E. Machani, Medford, MA (US)

(73) Assignee: RSA Security LLC, Bedford, MA (US)

( * ) Notice: Subject to any disclaimer, the term of this patent is extended or adjusted under 35 U.S.C. 154(b) by 0 days.

(21) Appl. No.: 17/060,812

(22) Filed: Oct. 1, 2020

(51) Int. Cl.
*G06F 21/31* (2013.01)
*G06F 17/18* (2006.01)
*G06F 11/34* (2006.01)

(52) U.S. Cl.
CPC ........ *G06F 21/316* (2013.01); *G06F 11/3438* (2013.01); *G06F 17/18* (2013.01)

(58) Field of Classification Search
CPC .................................................... G06F 3/0482
See application file for complete search history.

(56) References Cited

U.S. PATENT DOCUMENTS

| | | | |
|---|---|---|---|
| 8,332,932 B2 | 12/2012 | Kellas-Dicks et al. | |
| 2004/0073915 A1* | 4/2004 | Dureau ................. | H04H 60/46 725/9 |
| 2013/0263240 A1 | 10/2013 | Moskovitch | |
| 2016/0026383 A1* | 1/2016 | Lee ....................... | G06F 3/0488 715/773 |
| 2019/0121956 A1* | 4/2019 | Turgeman ............. | G06F 21/316 |
| 2020/0387587 A1* | 12/2020 | Perez-Rovira ..... | G06K 9/00885 |

OTHER PUBLICATIONS

Pin Shen Teh et al., A Survey of Keystroke Dynamics Biometrics, Review Article, Hindawi Publishing Comporation, The Scientific World Journal, vol. 2013, Article ID 408280, 24 pages, Aug. 2013, https://www.hindawi.com/journals/tswj/2013/408280/.
P.S. Dowland, Keystroke Analysis as a Method of Advanced User Authentication and Response, Department of Communication and Electronic Engineering, University of Plymouth, UK. M.A. Ghonaimy et al. (eds). Security in the Information Processing 2002, pp. 215-226, https://link.springer.com/chapter/10.1007/978-0-387-35586-3_17.

* cited by examiner

*Primary Examiner* — Di Xiao
(74) *Attorney, Agent, or Firm* — Danielson Legal LLC (57) ABSTRACT

Techniques are provided for user behavior analytics using keystroke analysis of pseudo-random data strings. One method comprises obtaining timestamps corresponding to keystroke activities on a device of a user associated with typing a pseudo-random character string comprising multiple characters, wherein at least one timestamp is adjusted based on errors associated with the typing of the pseudo-random character string; determining a time difference between keystroke activities associated with the pseudo-random character string using at least one adjusted timestamp; obtaining a time difference distribution for a subset of character sequences in the pseudo-random character string; determining a probability value for one or more character sequences in the subset; and determining an aggregate probability value for the pseudo-random character string based on the probability values. An authentication and/or an identity verification of the user can be based on the aggregate probability value for the pseudo-random character string.

17 Claims, 11 Drawing Sheets

FIG. 1

| DEVICE 210 | TOKEN CODE 220 | USER 230 | KEY 250 | KEY DOWN TIME 260 | KEY UP TIME 270 |
|---|---|---|---|---|---|
| 1080\|1920 | 52232193 | A | 5 | 1584651896179 | 1584651896273 |
| 1080\|1920 | 52232193 | A | 2 | 1584651896629 | 1584651896703 |
| 1080\|1920 | 52232193 | A | 2 | 1584651896769 | 1584651896870 |
| 1080\|1920 | 52232193 | A | 3 | 1584651898061 | 1584651898161 |
| 1080\|1920 | 52232193 | A | 2 | 1584651898195 | 1584651898292 |
| 1080\|1920 | 52232193 | A | 1 | 1584651898405 | 1584651898501 |
| 1080\|1920 | 52232193 | A | 9 | 1584651899002 | 1584651899103 |
| 1080\|1920 | 52232193 | A | 3 | 1584651899237 | 1584651899337 |

FIG. 2

| TOKEN CODE 310 | USER 320 | KEY 330 | KEY DOWN TIME 340 | KEY UP TIME 350 | KEY DOWN ADJUSTMENT 360 | KEY UP ADJUSTMENT 370 |
|---|---|---|---|---|---|---|
| 42964617 | A | 9 | 1584367971968 | 1584367972064 | | |
| 42964617 | A | 4 | 1584367972544 | 1584367972624 | | |
| 42964617 | A | BACK-SPACE | 1584367973872 | 1584367973936 | | |
| 42964617 | A | 6 | 1584367974753 | 1584367974801 | | |
| 42964617 | A | 4 | 1584367974960 | 1584367975056 | | |

FIG. 3A

| TOKEN CODE 310 | USER 320 | KEY 330 | KEY DOWN TIME 340 | KEY UP TIME 350 | KEY DOWN ADJUSTMENT 360 | KEY UP ADJUSTMENT 370 |
|---|---|---|---|---|---|---|
| 42964617 | A | 9 | 1584367971968 | 1584367972064 | 1584367973872 | 1584367973936 |
| 42964617 | A | 6 | 1584367974753 | 1584367974801 | | |
| 42964617 | A | 4 | 1584367974960 | 1584367975056 | | |

| TOKEN CODE 510 | KEY 530 | KEY DOWN TIME 540 | KEY UP TIME 550 | KEY DOWN ADJUSTMENT 560 | KEY UP ADJUSTMENT 570 |
|---|---|---|---|---|---|
| 64994306 | 6 | 1584731616638 | 1584731616742 | 0 | 0 |
| 64994306 | 4 | 1584731616782 | 1584731616886 | 0 | 0 |
| 64994306 | 9 | 1584731616974 | 1584731617071 | 0 | 0 |
| 64994306 | 9 | 1584731617143 | 1584731617239 | 0 | 0 |
| 64994306 | 4 | 1584731618399 | 1584731618464 | 0 | 0 |
| 64994306 | 3 | 1584731618847 | 1584731618934 | 0 | 0 |
| 64994306 | 0 | 1584731619159 | 1584731619286 | 1584731619559 | 1584731619686 |
| 64994306 | 6 | 1584731620182 | 1584731620270 | 0 | 0 |

| BIGRAM 610 | LATENCY 620 |
|---|---|
| '06' | 623 |
| '30' | 312 |
| '43' | 448 |
| '49' | 192 |
| '64' | 144 |
| '94' | 1256 |
| '99' | 169 |

FIG. 6

| BIGRAM 710 | LATENCY 720 |
|---|---|
| '48' | [512, 793, 1152, 520, 209, 544] |
| '82' | [792, 216, 376, 1040, 552, 1415, 1263, 904] |
| '38' | [209, 225, 184, 1329, 384, 384, 975, 1584] |
| '29' | [297, 1233, 2665, 192, 224, 344, 223, 216, 374] |

- Generate user keystroke activity profile 700 for user by aggregating user input features;
- Estimate each N-gram probability distribution 800;
- For each N-gram, calculate maximum possible distribution, MaxProbThreshold, based on N-gram probability distribution 800;
- An evaluated N-gram latency belongs to N-gram probability distribution 800 if probability of N-gram is greater than tThreshold * MaxProbThreshold, where tThreshold has default value of 0.3 (for example);
- When user keystroke activity profile 700 contains a configurable minimum number of entries, start calculating user keystroke similarity score, as follows:
  ○ Obtain user keystroke activity profile 700 ($P_k$) for $user_k$;
  ○ Obtain token code S entered by $user_k$;
  ○ Calculate N-gram latency (Table 600, FIG. 6 ) for N-grams in token code S, where $S_i$ is ith N-gram of user input S;
  ○ Find N-grams that exists both in S and in $P_k$, where size of intersect is M;
  ○ For each N-gram $S_i$ in intersect:
    ▪ Calculate probability $P_{k,i}$ of $S_i$ given user keystroke activity profile 700 for $user_k$ as $probIntrsct_i$, using N-gram probability distributions 800;
    ▪ If $probIntrsct_i >$ tThreshold * $MaxProbThreshold_{k,i}$ consider evaluated $N\text{-}gram_i$ as belonging to $user_k$ and add 1 to countTotal; and
  ○ Calculate final user score for given input S and profile $P_k$, as follows:
  $$Score(S, P_k) = \frac{1}{N} * countTotal;$$
- Authenticate $user_k$ if $Score(S, P_k)$ for token code S is greater than configurable value, such as 0.5; and
- Update user keystroke activity profile 700 with new entry when:
  ○ Authentication result accepted the submitted sample; or
  ○ Authentication result rejected submitted sample, S, but user successfully authenticated (for example, with a different multi-factor authentication method).

USER BEHAVIOR ANALYTICS USING KEYSTROKE ANALYSIS OF PSEUDO-RANDOM CHARACTER STRINGS

FIELD

The field relates generally to information processing techniques, and more particularly, to the field of user behavior analytics.

BACKGROUND

A user can be authenticated and/or have an identity verified using a biometric challenge-response system. Keystroke biometrics, for example, evaluate timing information associated with keystroke activities while the user is typing a character string. In existing keystroke biometric challenge-response systems, for example, timing information is collected for keystroke activities of the user while the user is typing a character string in response to a challenge. The timing information of the keystroke activities of the user while responding to the challenge is compared to timing information learned for the user using historical data.

A need exists for improved techniques for evaluating keystroke biometrics.

SUMMARY

In one embodiment, a method comprises obtaining one or more timestamps corresponding to keystroke activities associated with typing a pseudo-random character string comprising a plurality of characters on a device by a user, wherein at least one of the timestamps is adjusted based at least in part on one or more errors of the user associated with the typing of the pseudo-random character string; determining a time difference between two or more keystroke activities associated with the typing of a plurality of sequences of characters within the pseudo-random character string using at least one of the adjusted timestamps; obtaining a time difference distribution for at least a subset of the plurality of the sequences of characters, wherein the time difference distribution for each sequence of characters in the subset is obtained using historical typing data of the user; determining a probability value for one or more of the plurality of sequences of characters in the subset; and determining an aggregate probability value for the pseudo-random character string based at least in part on the probability values.

In some embodiments, the at least one timestamp is adjusted by increasing one or more of a timestamp of a key down activity and a timestamp of a key up activity associated with the typing of one or more characters of the pseudo-random character string. One or more of the keystroke activities can be removed that are associated with characters typed by the user that are entered in error. The time difference distributions can be obtained using historical typing data of the user for a plurality of devices of the user.

Other illustrative embodiments include, without limitation, apparatus, systems, methods and computer program products comprising processor-readable storage media.

BRIEF DESCRIPTION OF THE DRAWINGS

FIG. 9 illustrates exemplary pseudo code for a user keystroke authentication process that analyzes keystrokes of entered pseudo-random data strings, according to an embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for user behavior analytics using keystroke analysis of pseudo-random data strings.

In one or more embodiments, the disclosed techniques for a keystroke analysis of a typing of pseudo-random data strings by a user learns user typing patterns and then compares an evaluated typing pattern of a user as part of challenge to the historically learned patterns for the user and assigns a risk score based on the comparison. When the score is greater than a predefined threshold, for example, the user is considered authenticated.

In at least some embodiments, keystroke analysis is performed for a pseudo-random short string which can be dynamically generated and unknown to the user prior to the challenge time. For example, the pseudo-random short strings may comprise one-time-passwords (OTPs) used in multi-factor authentication (often referred as token codes) that are typically six-to-10 digit strings. In a further implementation, the pseudo-random short strings may comprise strings or codes that users typically cannot remember or rarely type, such as badge identifiers, credit card numbers and driver's license numbers. One or more aspects of the disclosure recognize that with dynamic, rarely entered and hard-to-memorize codes, keystroke patterns of users will be inconsistent.

Figure 1:
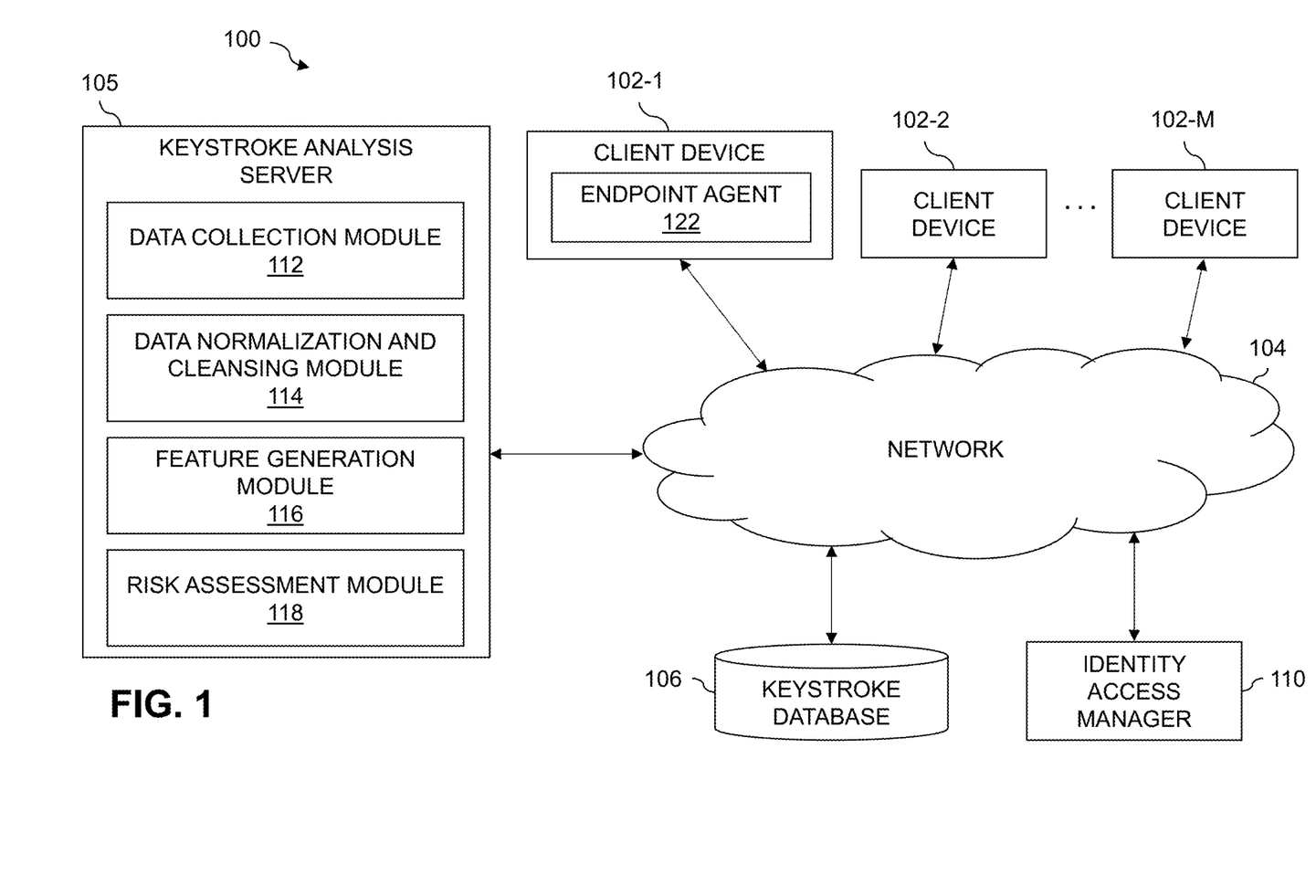
FIG. 1 shows an information processing system configured for user behavior analytics using keystroke analysis techniques in an illustrative embodiment.

FIG. 1 shows a computer network (also referred to herein as an information processing system) 100 configured in accordance with an illustrative embodiment. The computer network 100 comprises a plurality of client devices 102-1, 102-2, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is keystroke analysis server 105, as well as a keystroke database 106 and an identity access manager 110.

The client devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The client devices 102 (as evidenced in FIG. 1 by exemplary client device 102-1) further comprises an endpoint agent 122. As discussed further below, the endpoint agent 122 collects timestamps corresponding to keystroke activities on a particular client device 102 of the user while typing a pseudo-random character string that was provided as part of a challenge. For example, for each typed key, the endpoint agent 122 can collect the key down timestamp and key up timestamp and optionally a client device/browser fingerprint, as discussed further below in conjunction with FIG. 2. In some embodiments, the endpoint agent 122 can be implemented, for example, as JavaScript code in a browser to collect keystrokes.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the keystroke analysis server 105 can have an associated keystroke database 106 configured to store keystroke data pertaining to keystroke activity of the user and/or relevant historical keystroke data. The keystroke database 106 in the present embodiment is implemented using one or more storage systems associated with the keystroke analysis server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the keystroke analysis server 105 can be one or more input-output devices, which illustratively comprise keyboards, displays or other types of input-output devices in any combination. Such input-output devices can be used, for example, to support one or more user interfaces to the keystroke analysis server 105, as well as to support communication between the keystroke analysis server 105 and other related systems and devices not explicitly shown.

The client devices 102 and the keystroke analysis server 105 in the FIG. 1 embodiment are assumed to be implemented using at least one processing device. Each such processing device generally comprises at least one processor and an associated memory, and implements one or more functional modules for controlling certain features of the client devices 102 and the keystroke analysis server 105.

More particularly, client devices 102 and keystroke analysis server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

A network interface (not shown) allows the client devices 102 and/or the keystroke analysis server 105 to communicate over the network 104 with each other (as well as one or more other networked devices), and illustratively comprises one or more conventional transceivers.

As also depicted in FIG. 1, the keystroke analysis server 105 further comprises a data collection module 112, a data normalization and cleansing module 114, a feature generation module 116 and a risk assessment module 118. In at least one embodiment, the data collection module 112 collects timestamps and other information corresponding to keystroke activities on a device of a user while typing a pseudo-random character string. The exemplary data normalization and cleansing module 114 adjusts one or more timestamps based on one or more errors of the user while typing the pseudo-random character string, and removes one or more keystroke activities associated with characters typed by the user that are entered in error.

In some embodiments, the exemplary feature generation module 116 determines time difference features between two or more keystroke activities associated with a typing of sequences of characters within the pseudo-random character string typed by the user. The exemplary risk assessment module 118 determines and/or evaluates a risk score based on a comparison of an evaluated typing pattern of a user to the historically learned patterns for the user, using the disclosed techniques for user behavior analytics using keystroke analysis of pseudo-random data strings. When the score is greater than a predefined threshold, for example, the risk assessment module 118 can authenticate the user.

In some embodiments, the challenge associated with a keystroke analysis can be generated by a different entity than the keystroke analysis server 105, such as another server that is part of a challenge-response system.

It is to be appreciated that this particular arrangement of modules 112, 114, 116 and 118 illustrated in the keystroke analysis server 105 of the FIG. 1 embodiment is presented by way of example only, and alternative arrangements can be used in other embodiments. For example, the functionality associated with modules 112, 114, 116 and 118 in other embodiments can be combined into a single module, or separated across a larger number of modules. As another example, multiple distinct processors can be used to implement different ones of modules 112, 114, 116 and 118 or portions thereof.

In some embodiments, the risk assessment module 118 may be part of another device, such as an identity access manager 110. The identity access manager 110 may be implemented, for example, using RSA SecurID Access, commercially available from RSA Security LLC. Generally, identity access management helps to ensure that the proper people of an organization have the appropriate access to resources.

At least portions of modules 112, 114, 116 and 118 may be implemented at least in part in the form of software that is stored in memory and executed by a processor.

It is to be understood that the particular set of elements shown in FIG. 1 for user behavior analytics using keystroke analysis involving client devices 102 of computer network 100 is presented by way of illustrative example only, and in other embodiments additional or alternative elements may be used. Thus, another embodiment includes additional or alternative systems, devices and other network entities, as well as different arrangements of modules and other components.

Exemplary processes utilizing one or more of modules 112, 114, 116 and 118 of an example keystroke analysis server 105 in computer network 100 will be described in more detail with reference to FIGS. 9 and 10.

Figure 2:
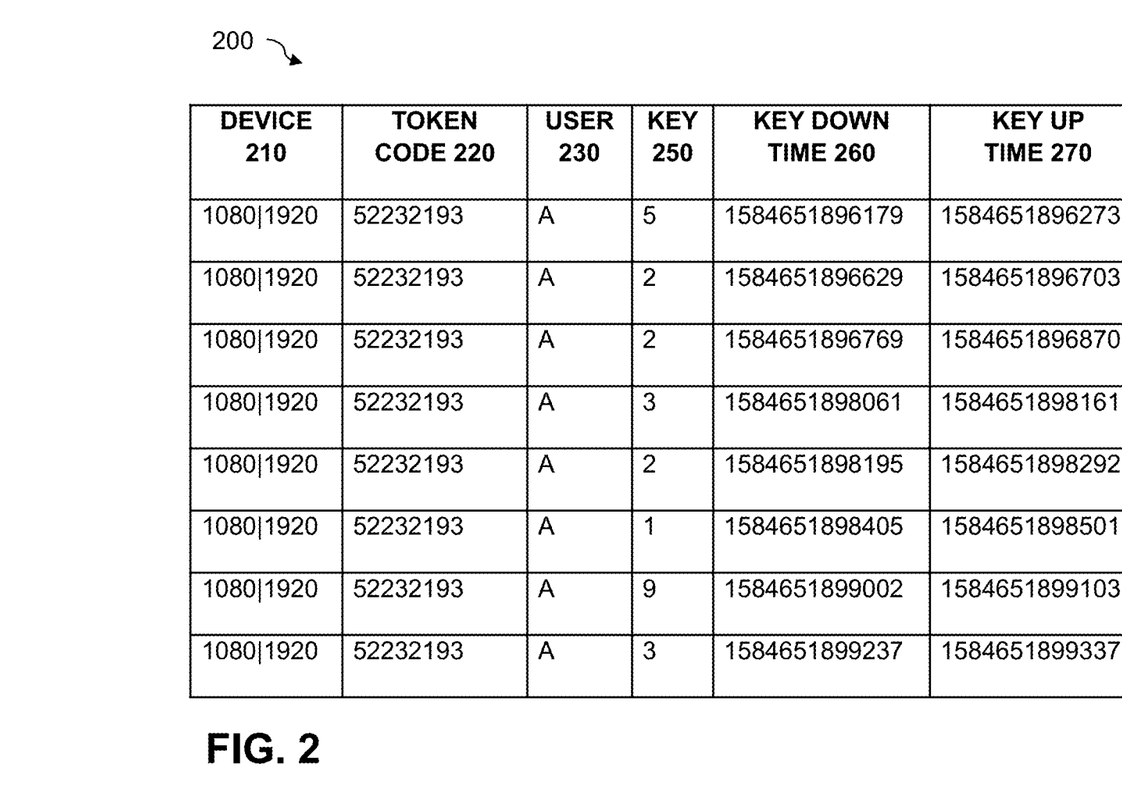
FIG. 2 is a sample table illustrating an exemplary keystroke activity timestamp database, according to one embodiment of the disclosure.

FIG. 2 is a sample table illustrating an exemplary keystroke activity timestamp database 200, according to one embodiment of the disclosure. As noted above, for each typed key, the endpoint agent 122 can collect the key down timestamp and key up timestamp and optionally a client device/browser fingerprint. As shown in FIG. 2, the exemplary keystroke activity timestamp database 200 comprises, for each timestamp, a device identifier 210, such as a screen size of the client device 102, an indication of the token code 220, a user identifier 230, a particular key entry 250 of the attempted token code 220, as well as the corresponding key down and key up times 260, 270, respectively, for each typed character of the attempted token code 220. It is noted that in the example of FIG. 2 the user entered the individual keys 250 of the token code 220 without error.

As noted above, once the data was collected and reached the keystroke analysis server 105, the data is cleaned by the data normalization and cleansing module 114, and the keystroke analysis features are created by the feature generation module 116. Generally, in at least some embodiments, the data normalization and cleansing module 114 deletes special keys in a submitted sequence of keys, such as all keys other than alphanumeric keys, symbols and backspace. For example, the data normalization and cleansing module 114 may remove the following keys: delete, insert, arrow up, arrow down, arrow left, arrow right, home, shift, enter, tab, control, alt, delete, and "caps" lock.

Figure 3A:
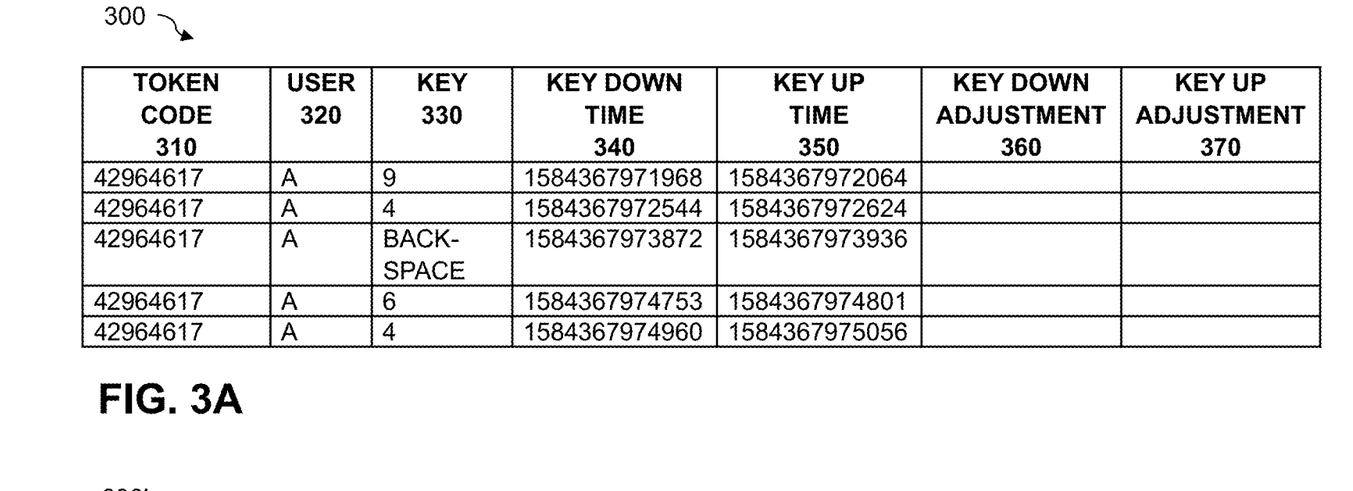
FIGS. 3A and 3B illustrate an exemplary keystroke activity timestamp database, according to one embodiment.
Figure 3B:
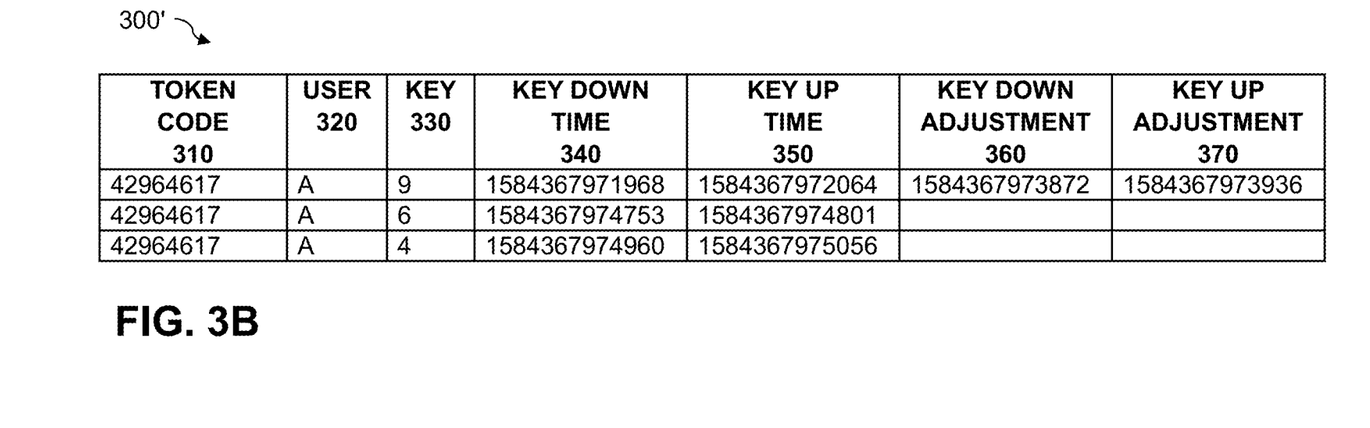

FIGS. 3A and 3B illustrate an exemplary keystroke activity timestamp database 300 and 300', according to at least one embodiment. In addition to deleting special keys in a submitted sequence of keys, the data normalization and cleansing module 114 adjusts one or more of the time stamps for errors in typing the pseudo-random data strings. In the example of FIG. 3A, the exemplary keystroke activity timestamp database 300 is shown for the actual keys typed by the user, and the exemplary keystroke activity timestamp database 300' is shown following a cleansing by the data normalization and cleansing module 114.

As shown in FIGS. 3A and 3B, the exemplary keystroke activity timestamp database 300 and 300' modifies the keystroke activity timestamp database 200 of FIG. 2 by adding new columns to the table for each user keystroke, such as key down adjustment 360 and key up adjustment 370. Columns 310, 320, 330, 340 and 350 are implemented in a similar manner as the corresponding fields of FIG. 2.

Generally, as users make errors while typing a key in the pseudo-random data string, the key down adjustment column 360 and/or the key up adjustment column 370 will comprise the shifted time of the deleted keystrokes. For example, as shown in column 330 of FIG. 3A, the user enters a key sequence of 9, 4, backspace, 6, 4, indicating that the first appearance of key 4 was pressed in error, relative to the token code shown in column 310, and then the user deleted the first appearance of key 4 using the backspace key. In at least some embodiments, each time a backspace key is pressed, the previous record in the table 300 is deleted and the key down and key up timestamps in columns 340 and 350 for the record associated with the backspace key are added to the key down and key up adjusted timestamps in columns 360 and 370 for the last valid key, as shown in FIG. 3B.

As noted above, the exemplary feature generation module 116 determines time difference features between two or more keystroke activities associated with a typing of sequences of characters within the pseudo-random character string typed by the user. In some embodiments, the time difference features may include, for example:

typing speed (latency)—difference between the key down times between the key presses of a sequence of keys;
    flight time—difference between the key up time and the key down time for the release of one key and the press of another key is used; and hold time (sometimes referred to as dwell time or pressure duration)—difference between the key up time and the key down time between the press and release of each key sequence is used.

Figure 4:
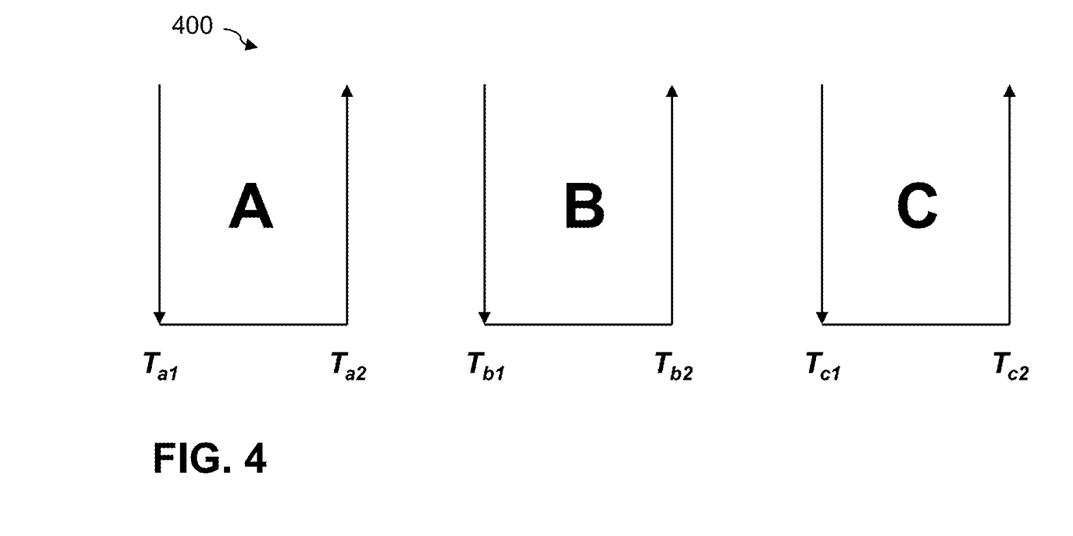
FIG. 4 illustrates various timestamps associated with typing of a sequence of characters by a user, according to an embodiment of the disclosure.

FIG. 4 illustrates various timestamps associated with typing 400 of a sequence of three exemplary characters (A, B, C) by a user, according to an embodiment of the disclosure. As shown in FIG. 4, a timestamp is associated with each key down and key up activity associated with the typing of a given character. For example, the key down and key up activity associated with the typing of the letter A have timestamps of $T_{a_1}$ and $T_{a_2}$, respectively. Similarly, the key down and key up activity associated with the typing of the letter B have timestamps of $T_{b_1}$ and $T_{b_2}$, respectively, and the key down and key up activity associated with the typing of the letter C have timestamps of $T_{c_1}$ and $T_{c_2}$, respectively.

For an exemplary implementation that employs a latency time difference feature, an N-grams latency is determined for sequences of characters of length N. Using the example of FIG. 4 for a bigram (N=2), the latency between the typing of characters A and B can be expressed as $T_{b_1}-T_{a_1}$ (or to generalize, for a bigram $K_iK_{i+1}$, the latency is given by keydown$_{i+1}$−keydown$_i$). In some embodiments, the latency time difference feature is determined for each different client device 102 employed by a given user, since the user may exhibit different typing patterns on different keyboards and/or devices (for example, a typing speed of a user may be slower on the smaller keypad typically associated with a mobile device).

In general, the time difference features can be based on any time difference between two (or more) keystroke activities associated with a sequence of characters. For example, the following time differences can be employed, using the exemplary timestamps of FIG. 4:

$T_{b_2}-T_{b_1}$ or $T_{b_2}-T_{a_2}$ or $T_{b_2}-T_{a_1}$ or $T_{b_1}-T_{a_2}$ or $T_{b_1}-T_{a_1}$.

Figure 5:
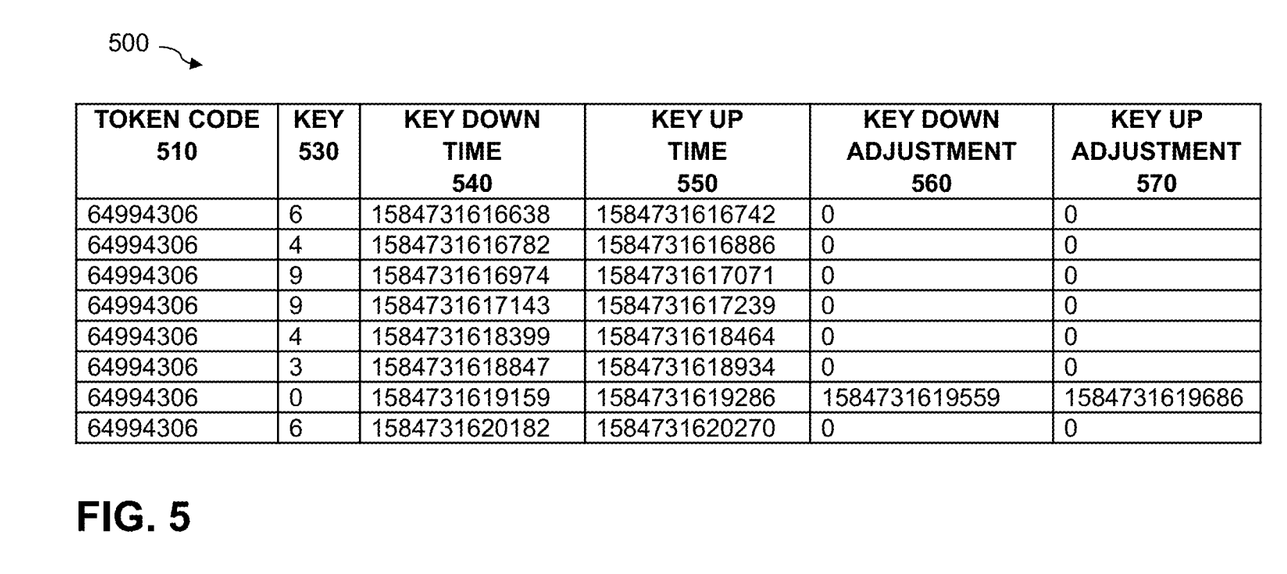
FIG. 5 is a sample table illustrating an exemplary keystroke activity timestamp database for an exemplary typing of a token code by a user, following a cleansing and time adjustments by the data normalization and cleansing module of FIG. 1, according to some embodiments of the disclosure.

FIG. 5 is a sample table illustrating an exemplary keystroke activity timestamp database 500 for an exemplary typing of token code 64994306 by a user, following a cleansing and time adjustments by the data normalization and cleansing module 114, according to some embodiments of the disclosure. In the example of FIG. 5, the bigram latency for the character sequence 64 is (1584731616782−1584731616638)=144. Columns 510, 530, 540, 550 and 570 in FIG. 5 are implemented in a similar manner as the corresponding fields of FIG. 3B.

Figure 6:
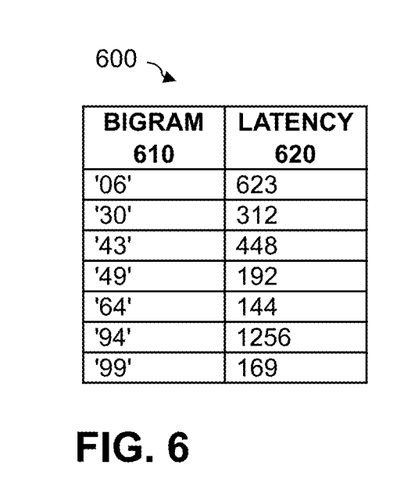
FIG. 6 is a sample table illustrating an exemplary bigram latency for a number of sequences of the exemplary token code of FIG. 5, according to one or more embodiments of the disclosure.

FIG. 6 is a sample table 600 illustrating an exemplary bigram latency 620 for a number of bigram sequences 610 of the exemplary token code of FIG. 5, according to one or more embodiments of the disclosure.

In at least some embodiments, when there is a value greater than 0 in the key down adjustment column 560 of FIG. 5, for a given key $K_i$, then the latency feature for the sequence $K_iK_{i+1}$ can be expressed as follows:

key down adjustment$_{i+1}$−key down adjustment$_i$.

Figure 7:
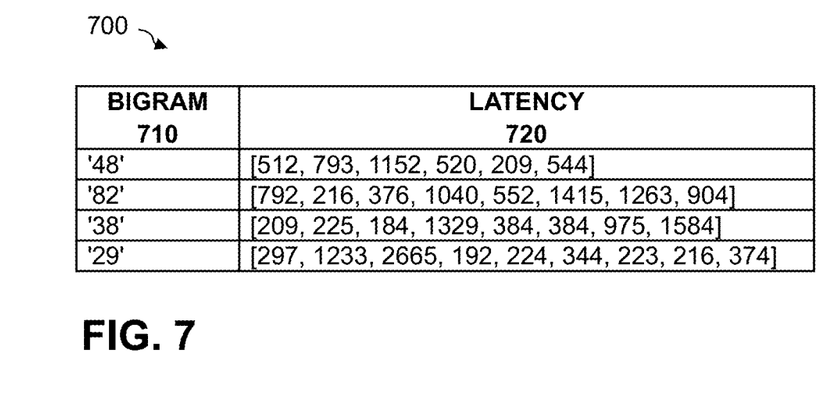
FIG. 7 is a sample table illustrating an exemplary user keystroke activity profile comprising an aggregated history of latency values observed for a given user for each N-gram across multiple pseudo-random data strings, according to at least one embodiment.

FIG. 7 is a sample table illustrating an exemplary user keystroke activity profile 700 comprising an aggregated history of latency values observed for a given user for each N-gram across multiple pseudo-random data strings, according to at least one embodiment. As shown in FIG. 7, for each observed bigram (N=2) 710 typed by user, the history of observed latency values 720 is recorded to provide a time difference distribution.

While the example of FIG. 7 records the history of observed latency values 720 without regard to the position of the bigram in the longer sequence, further variations can record the latency values 720 along with an indication of the position of the bigram in the longer sequence. For example, a user can typically remember the first few characters when typing a longer sequence, and will typically type those characters more quickly and/or with fewer errors. Thus, the first few characters, for example, may optionally be treated differently in the profile 700 than subsequent positions in the longer sequence.

Figure 8:
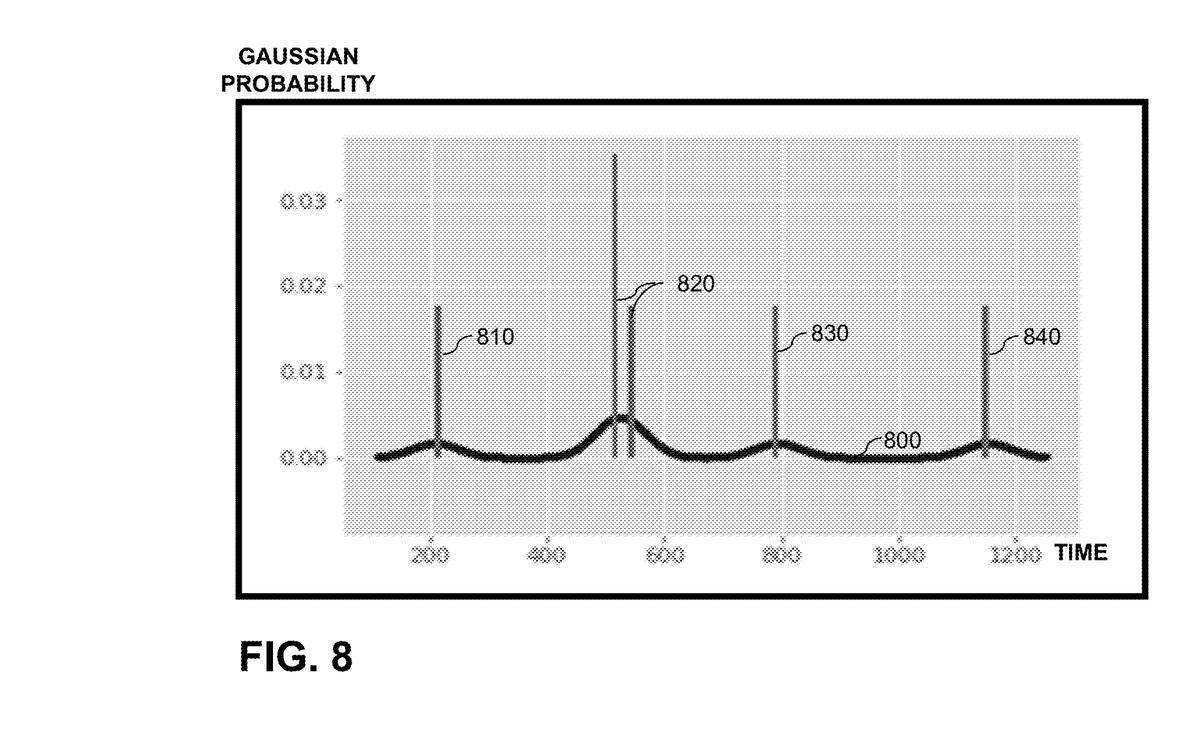
FIG. 8 illustrates a probability distribution of the exemplary latency values of a given user for a particular bigram from the user keystroke activity profile of FIG. 7, according to one or more embodiments of the disclosure.

FIG. 8 illustrates a probability distribution 800 of the exemplary latency values of a given user for a particular bigram ('48') from the user keystroke activity profile 700 of FIG. 7, according to one or more embodiments of the disclosure. As shown in FIG. 7, the history of latency values observed for a given user for a bigram of '48' across multiple pseudo-random data strings comprises latency values of 512, 793, 1152, 520, 209, and 544.

When these latency values are placed in the probability distribution 800 of FIG. 8, where the probability is expressed as a function of latency time, the user exhibits four different typing patterns 810, 820, 830, 840 for typing the 48 bigram, associated with clusters in the probability distribution 800 (where the cluster 820, for example, has samples latency values of 512/520 and 544). In general, a number of closer latency samples correlates with a higher probability value (more trust is assigned to the user in areas of probability peak values). In addition, the magnitude for each latency value indicates the number of samples for the bigram with the same (or substantially similar) the respective latency value.

The four different typing patterns 810, 820, 830, 840 for typing the same bigram (or more generally, N-gram), is caused by the randomness of the pseudo-random data strings. The 48 bigram appears in different locations in the different pseudo-random data strings, with different digits that came before and after the bigram. For example, in '3489' sequence, the 48 bigram latency will be higher, as the user will split the sequence into 34 and 89 while typing. On other hand, if 48 appears in the beginning of the token code (or another pseudo-random data string), the latency would normally be lower, as the user will remember the first several digits of the token code.

Among other benefits, the disclosed techniques for user behavior analytics using keystroke analysis of pseudo-random data strings learn the common bigram latencies but also assign an appropriate weight for a possible range using the probability distribution for the N-gram, such as the probability distribution 800 of FIG. 8. For example, the following latencies [512, 520, 544] for the 48 bigram of FIGS. 7 and 8 create a gaussian distribution that will accept possible values, for example, between 450 and 600.

FIG. 9 illustrates exemplary pseudo code for a user keystroke authentication process 900 that analyzes keystrokes of entered pseudo-random data strings, according to an embodiment. In the example of FIG. 9, the exemplary user behavior analytics process 900 comprises the following steps:

Generate user keystroke activity profile 700 for user by aggregating user input features;
Estimate each N-gram probability distribution 800;
For each N-gram, calculate a maximum possible distribution, MaxProbThreshold, based on the N-gram probability distribution 800;
An evaluated N-gram latency belongs to the N-gram probability distribution 800 if the probability of the N-gram is greater than tThreshold*MaxProbThreshold, where tThreshold has a default value of 0.3 in some embodiments;

When the user keystroke activity profile 700 contains a configurable minimum number of entries, a user keystroke similarity score can be calculated, as follows:

Obtain user keystroke activity profile 700 ($P_k$) for user$_k$;
Obtain token code S entered by user$_k$;
Calculate N-gram latency (Table 600, FIG. 6) for N-grams in entered token code S, where $S_i$ is the $i^{th}$ N-gram of user input S;
Find the N-grams that exists both in S and in $P_k$, where the size of the intersect is M;
For each N-gram $S_i$ in intersect:
  Calculate the probability $P_{k,i}$ of $S_i$ given the user keystroke activity profile 700 for user$_k$ as probIntrsct$_i$, using N-gram probability distributions 800;
  If probIntrsct$_i$>tThreshold*MaxProbThreshold$_{k,i}$ consider the evaluated N-gram$_i$ as belonging to user$_k$ and add 1 to countTotal; and
Calculate final user score forgiven entered token code S and user keystroke activity profile $P_k$, as follows:

$$\text{Score}(S, P_k) = \frac{1}{N} * countTotal;$$

Authenticate user$_k$ if Score(S, $P_k$) for entered token code S is greater than a configurable value, such as 0.5; and
Update user keystroke activity profile 700 with a new entry when:
  The authentication result accepted the submitted sample; or
  The authentication result rejected the submitted sample, S, but the user successfully authenticated (for example, with a different multi-factor authentication method).

Figure 10:
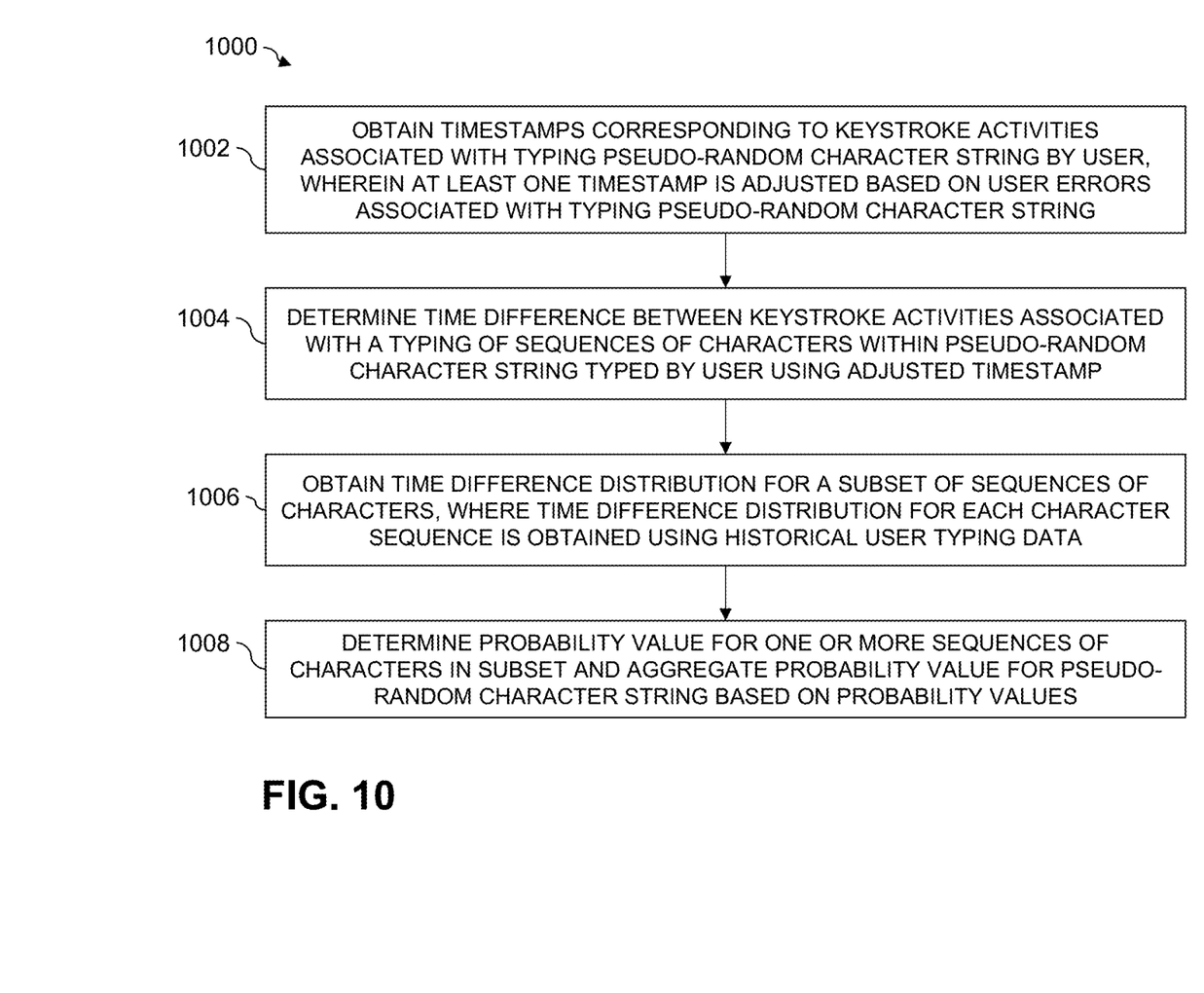
FIG. 10 is a flow chart illustrating an exemplary implementation of a user keystroke authentication process that analyzes keystrokes of entered pseudo-random data strings, according to one embodiment of the disclosure.

FIG. 10 is a flow chart illustrating an exemplary implementation of a user keystroke authentication process 1000 that analyzes keystrokes of entered pseudo-random data strings, according to one embodiment of the disclosure. As shown in FIG. 10, the exemplary user keystroke authentication process 1000 initially obtains one or more timestamps during step 1002 corresponding to keystroke activities associated with typing a pseudo-random character string comprising a plurality of characters by a user, wherein at least one of the timestamps is adjusted based at least in part on one or more typing errors of the user associated with the typing of the pseudo-random character string.

During step 1004, the exemplary policy-based risk assessment completion process 1000 determines a time difference between two or more keystroke activities associated with a typing of a plurality of sequences of characters within the pseudo-random character string using at least one of the adjusted timestamps.

The policy-based risk assessment completion process 1000 then obtains a time difference distribution during step 1006 for at least a subset of the plurality of the sequences of characters, wherein the time difference distribution for each sequence of characters in the subset is obtained using historical typing data of the user.

Finally, during step 1008, the policy-based risk assessment completion process 1000 determines (i) a probability value for each of a plurality of sequences of characters in the subset, and (ii) an aggregate probability value for the pseudo-random character string based at least in part on the probability values. The policy-based risk assessment completion process 1000 can option determine an outcome of an authentication of the user and/or an identity verification of the user based on the aggregate probability value for the pseudo-random character string.

The particular processing operations and other network functionality described in conjunction with FIGS. 9 and 10 are presented by way of illustrative example only, and should not be construed as limiting the scope of the disclosure in any way. Alternative embodiments can use other types of processing operations to perform user behavior analytics using keystroke analysis of pseudo-random data strings. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

Among other benefits, the disclosed user behavior analytic techniques using a keystroke analysis of pseudo-random data strings can be used as part of a multi-factor authentication and/or contextual analysis, during and after a user log in event.

One or more embodiments of the disclosure provide improved methods, apparatus and computer program products for user behavior analytics using keystroke analysis of pseudo-random data strings. The foregoing applications and associated embodiments should be considered as illustrative only, and numerous other embodiments can be configured using the techniques disclosed herein, in a wide variety of different applications.

It should also be understood that the disclosed user behavior analytic techniques using keystroke analysis, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for keystroke analysis of pseudo-random data strings may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based keystroke analysis engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based keystroke analysis platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. These platforms may also be used to implement at least portions of other information processing systems in other embodiments.

Figure 11:
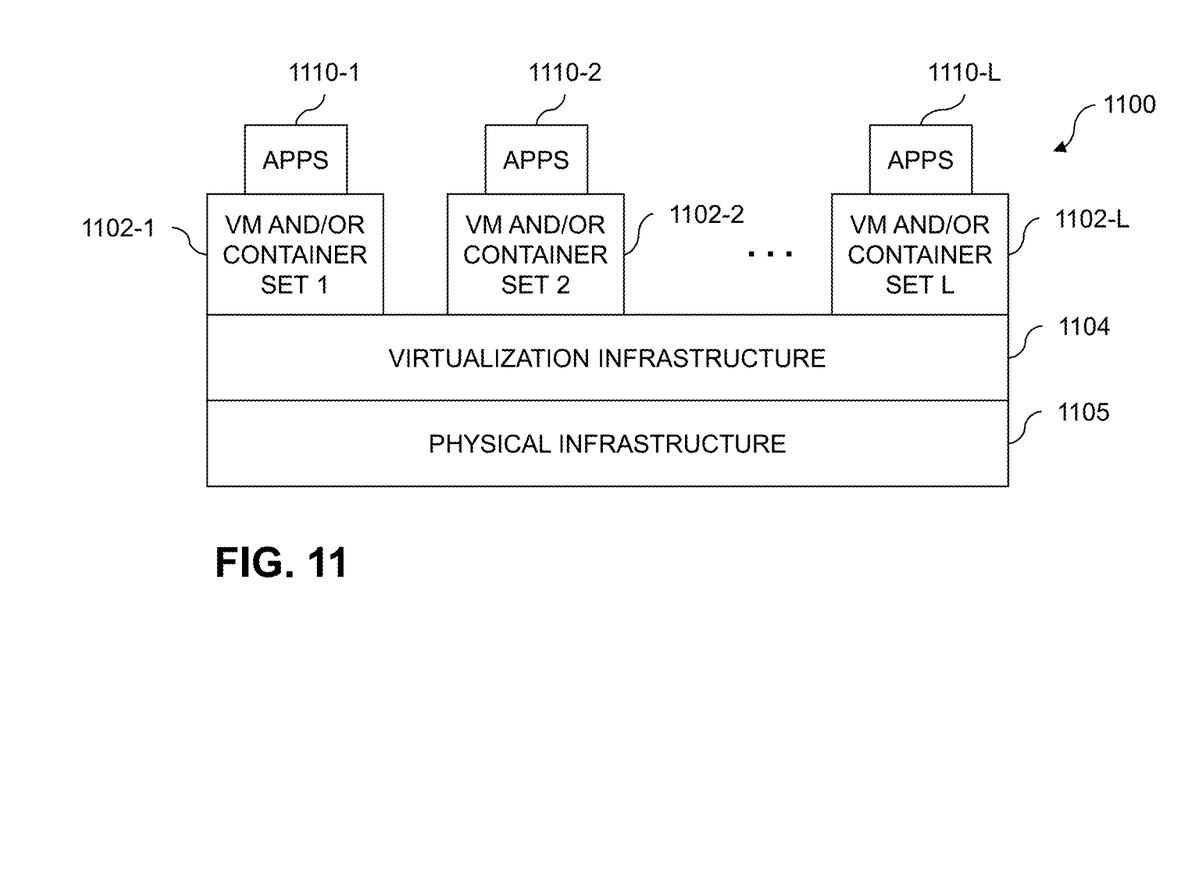
FIG. 11 illustrates an exemplary processing platform that may be used to implement at least a portion of one or more embodiments of the disclosure comprising a cloud infrastructure.

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide keystroke analysis functionality of pseudo-random data strings of the type described above for one or more processes running on a given one of the VMs. For example, each of the VMs can implement keystroke analysis control logic and associated user keystroke activity profiles for providing keystroke analysis functionality for one or more processes running on that particular VM.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide keystroke analysis functionality of the type described above for one or more processes running on different ones of the containers. For example, a container host device supporting multiple containers of one or more container sets can implement one or more instances of keystroke analysis control logic and associated user keystroke activity profiles for use in analyzing keystrokes associated with pseudo-random data strings.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises at least a portion of the given system and includes a plurality of processing devices, denoted 1202-1, 1202-2, 1202-3, . . . 1202-K, which communicate with one another over a network 1204. The network 1204 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1202-1 in the processing platform 1200 comprises a processor 1210 coupled to a memory 1212. The processor 1210 may comprise a microprocessor, a microcontroller, an application specific integrated circuit (ASIC), a field programmable gate array (FPGA) or other type of processing circuitry, as well as portions or combinations of such circuitry elements, and the memory 1212, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the given system may include additional or alternative processing platforms, as well as numerous distinct processing platforms in any combination, with each such platform comprising one or more computers, storage devices or other processing devices.

Figure 12:
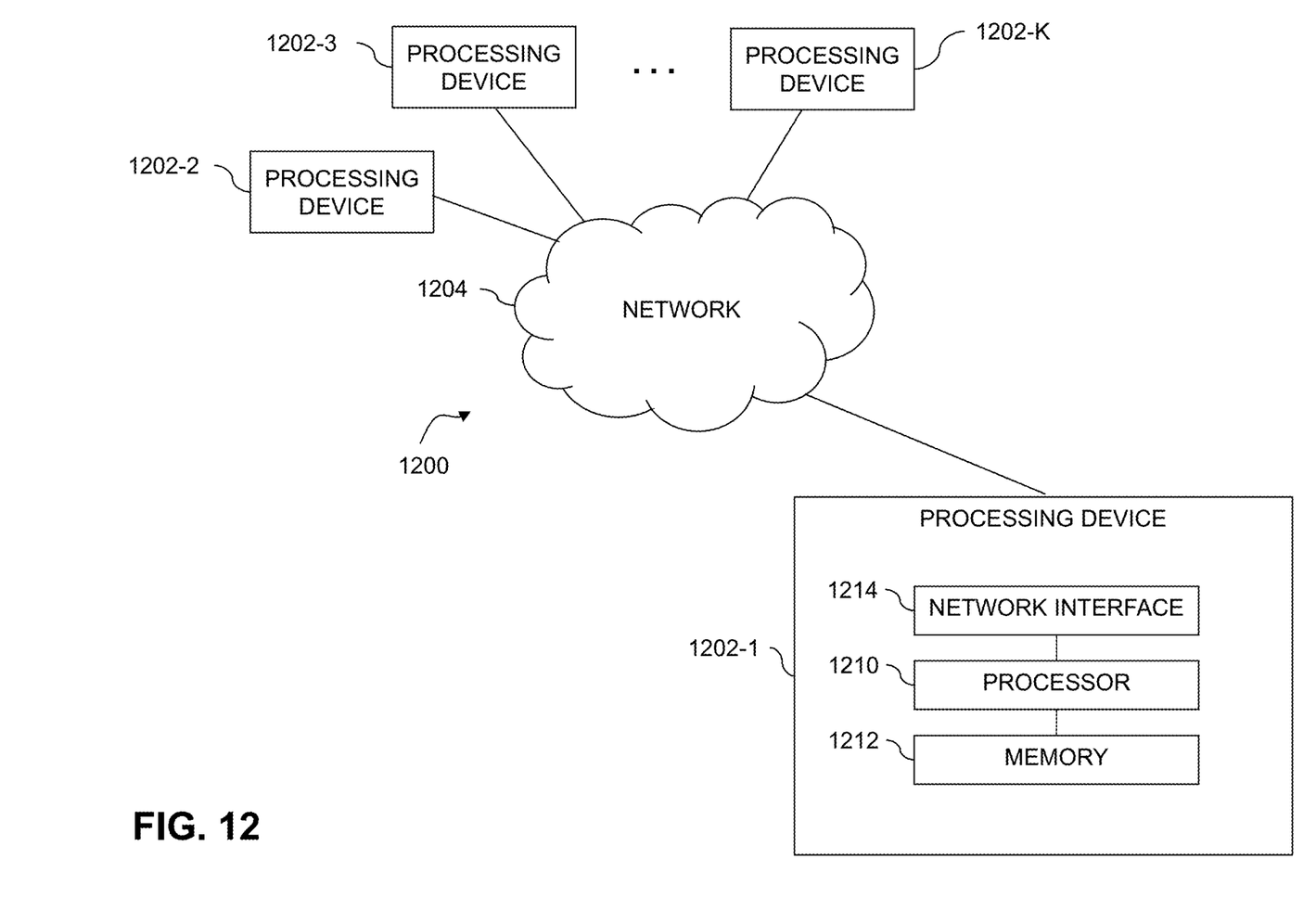
FIG. 12 illustrates another exemplary processing platform that may be used to implement at least a portion of one or more embodiments of the disclosure.

Multiple elements of an information processing system may be collectively implemented on a common processing platform of the type shown in FIG. 11 or 12, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining one or more timestamps corresponding to keystroke activities associated with typing a pseudo-random character string comprising a plurality of characters on a device by a user, wherein at least one of the timestamps is adjusted based at least in part on one or more errors of the user associated with the typing of the pseudo-random character string, wherein the at least one timestamp is adjusted by increasing one or more of a timestamp of a key down activity and a timestamp of a key up activity associated with the typing of one or more characters of the pseudo-random character string;
    determining a time difference between two or more keystroke activities associated with the typing of a plurality of sequences of characters within the pseudo-random character string using at least one of the adjusted timestamps;
    obtaining a time difference distribution for at least a subset of the plurality of the sequences of characters, wherein the time difference distribution for each sequence of characters in the subset is obtained using historical typing data of the user;
    determining a probability value for one or more of the plurality of sequences of characters in the subset; and
    determining an aggregate probability value for the pseudo-random character string based at least in part on the probability values,
    wherein an outcome of one or more of an authentication of the user and an identity verification of the user is determined based at least in part on the aggregate probability value for the pseudo-random character string,
    wherein the method is performed by at least one processing device comprising a processor coupled to a memory.

2. The method of claim 1, wherein the determining the time difference associated with typing a given sequence of N characters by the user comprises determining a time difference between one or more of: (i) a key down activity associated with a first character in the given sequence and a key down activity associated with an Nth character in the given sequence, and (ii) a key up activity associated with a first character in the given sequence and a key down activity associated with an Nth character in the given sequence.

3. The method of claim 1, further comprising removing one or more of the keystroke activities associated with characters typed by the user that are entered in error.

4. The method of claim 1, wherein the one or more timestamps corresponding to the keystroke activities correspond to keystroke activities associated with a typing of valid characters within the pseudo-random character string.

5. The method of claim 1, wherein the time difference distributions are obtained using historical typing data of the user for a plurality of devices of the user.

6. The method of claim 1, wherein the time difference distributions are learned for multiple starting positions within a plurality of the pseudo-random character strings of each of the plurality of the sequences of characters.

7. The method of claim 1, wherein the determining an aggregate probability value for the pseudo-random character string comprises comparing each probability value for each of the plurality of sequences of characters in the subset to a corresponding threshold and influencing the aggregate probability value based on a result of each comparison.

8. An apparatus comprising:
at least one processing device comprising a processor coupled to a memory;
the at least one processing device being configured to implement the following steps:
obtaining one or more timestamps corresponding to keystroke activities associated with typing a pseudo-random character string comprising a plurality of characters on a device by a user, wherein at least one of the timestamps is adjusted based at least in part on one or more errors of the user associated with the typing of the pseudo-random character string, wherein the at least one timestamp is adjusted by increasing one or more of a timestamp of a key down activity and a timestamp of a key up activity associated with the typing of one or more characters of the pseudo-random character string;
determining a time difference between two or more keystroke activities associated with the typing of a plurality of sequences of characters within the pseudo-random character string using at least one of the adjusted timestamps;
obtaining a time difference distribution for at least a subset of the plurality of the sequences of characters, wherein the time difference distribution for each sequence of characters in the subset is obtained using historical typing data of the user;
determining a probability value for one or more of the plurality of sequences of characters in the subset; and
determining an aggregate probability value for the pseudo-random character string based at least in part on the probability values,
wherein an outcome of one or more of an authentication of the user and an identity verification of the user is determined based at least in part on the aggregate probability value for the pseudo-random character string.

9. The apparatus of claim 8, wherein the determining the time difference associated with typing a given sequence of N characters by the user comprises determining a time difference between one or more of: (i) a key down activity associated with a first character in the given sequence and a key down activity associated with an Nth character in the given sequence, and (ii) a key up activity associated with a first character in the given sequence and a key down activity associated with an Nth character in the given sequence.

10. The apparatus of claim 8, further comprising removing one or more of the keystroke activities associated with characters typed by the user that are entered in error.

11. The apparatus of claim 8, wherein the one or more timestamps corresponding to the keystroke activities correspond to keystroke activities associated with a typing of valid characters within the pseudo-random character string.

12. The apparatus of claim 8, wherein the time difference distributions are obtained using historical typing data of the user for a plurality of devices of the user.

13. A non-transitory processor-readable storage medium having stored therein program code of one or more software programs, wherein the program code when executed by at least one processing device causes the at least one processing device to perform the following steps:
obtaining one or more timestamps corresponding to keystroke activities associated with typing a pseudo-random character string comprising a plurality of characters on a device by a user, wherein at least one of the timestamps is adjusted based at least in part on one or more errors of the user associated with the typing of the pseudo-random character string, wherein the at least one timestamp is adjusted by increasing one or more of a timestamp of a key down activity and a timestamp of a key up activity associated with the typing of one or more characters of the pseudo-random character string;
determining a time difference between two or more keystroke activities associated with the typing of a plurality of sequences of characters within the pseudo-random character string using at least one of the adjusted timestamps;
obtaining a time difference distribution for at least a subset of the plurality of the sequences of characters, wherein the time difference distribution for each sequence of characters in the subset is obtained using historical typing data of the user;
determining a probability value for one or more of the plurality of sequences of characters in the subset; and
determining an aggregate probability value for the pseudo-random character string based at least in part on the probability values,
wherein an outcome of one or more of an authentication of the user and an identity verification of the user is determined based at least in part on the aggregate probability value for the pseudo-random character string,
wherein an outcome of one or more of an authentication of the user and an identity verification of the user is determined based at least in part on the aggregate probability value for the pseudo-random character string.

14. The non-transitory processor-readable storage medium of claim 13, wherein the determining the time difference associated with typing a given sequence of N characters by the user comprises determining a time difference between one or more of: (i) a key down activity associated with a first character in the given sequence and a key down activity associated with an Nth character in the given sequence, and (ii) a key up activity associated with a first character in the given sequence and a key down activity associated with an Nth character in the given sequence.

15. The non-transitory processor-readable storage medium of claim 13, further comprising removing one or more of the keystroke activities associated with characters typed by the user that are entered in error.

16. The non-transitory processor-readable storage medium of claim 13, wherein the one or more timestamps corresponding to the keystroke activities correspond to keystroke activities associated with a typing of valid characters within the pseudo-random character string.

17. The non-transitory processor-readable storage medium of claim 13, wherein the time difference distributions are obtained using historical typing data of the user for a plurality of devices of the user.

* * * * *